United States Patent [19]

Weiss

[11] Patent Number: 4,466,461

[45] Date of Patent: Aug. 21, 1984

[54] VALVE

[76] Inventor: Johann Weiss, Hauptstrasse 19, D-7799 Illmensee, Fed. Rep. of Germany

[21] Appl. No.: 359,866

[22] Filed: Mar. 19, 1982

[30] Foreign Application Priority Data

Mar. 20, 1981 [DE] Fed. Rep. of Germany ....... 3110907

[51] Int. Cl.³ .............................................. F16K 5/12
[52] U.S. Cl. .................................. 137/625.3; 251/121; 251/344
[58] Field of Search .................. 137/599.2, 625.3, 556; 251/120, 121, 126, 122, 344; 138/43, 46

[56] References Cited

U.S. PATENT DOCUMENTS

| 1,810,331 | 6/1931 | Wilhjelm | 137/625.3 |
| 2,013,822 | 9/1935 | Brabury | 137/625.3 |
| 2,833,311 | 5/1958 | Baldelli | 138/43 |
| 2,924,237 | 2/1960 | Ellis | 251/344 |
| 3,252,480 | 5/1966 | Odendahl | 137/625.3 |
| 3,469,591 | 9/1969 | Odendahl | 137/625.3 |
| 4,337,788 | 7/1982 | Seger | 251/122 |
| 4,375,939 | 3/1933 | Mount et al. | 138/43 |

Primary Examiner—Martin P. Schwadron
Assistant Examiner—Mark Malkin
Attorney, Agent, or Firm—Bachman and LaPointe

[57] ABSTRACT

A control component such as a valve or throttle member for a hydraulic system comprises an outer member, and a body portion disposed in the outer member and having an outside surface co-operable with an inside surface of the outer member, the outer member and body portion being movable relative to each other. The flow duct extending between the inlet and outlet of the component includes at least one flow passage which opens at the outside surface of the body portion, and the mouth opening of the flow passage communicates with a curved duct portion which extends at an inclined angle relative to a radial plane through the body portion. The flow section of the or each duct portion decreases towards the tip thereof, to provide finely adjustable control of the flow of fluid through the component.

23 Claims, 15 Drawing Figures

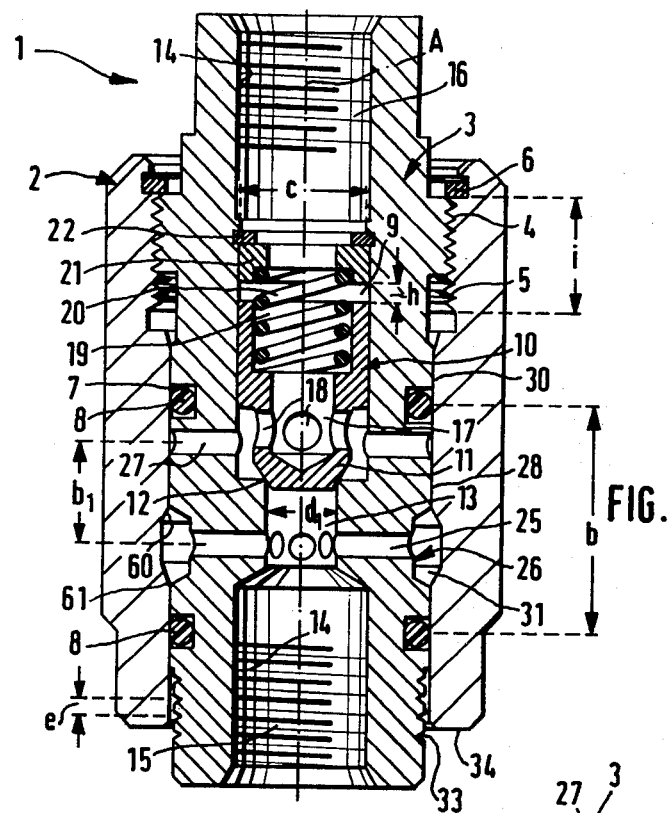
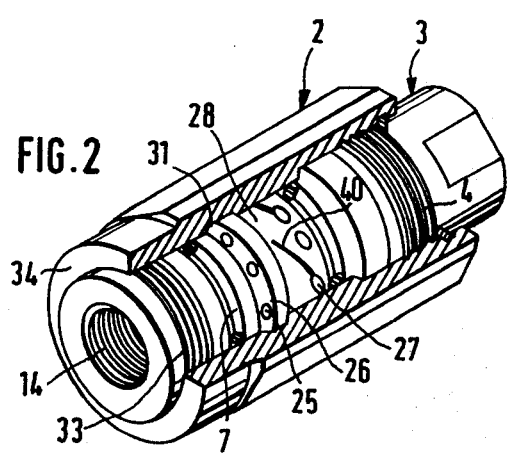
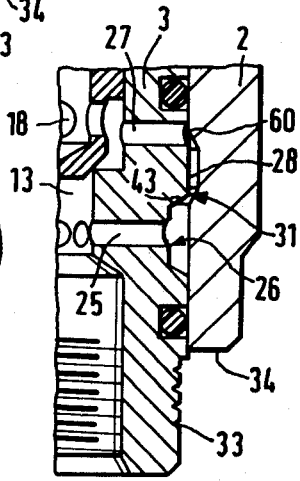
FIG.1
FIG.2
FIG.1a

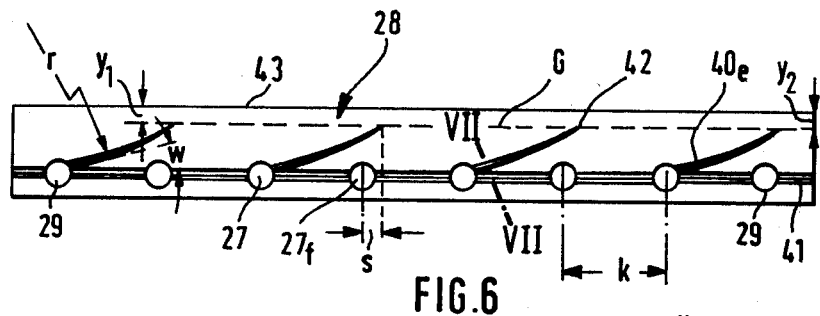
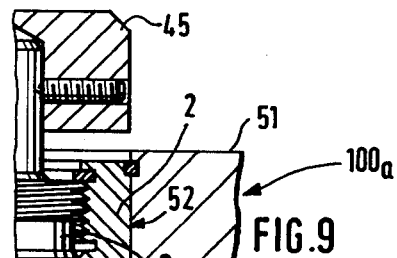
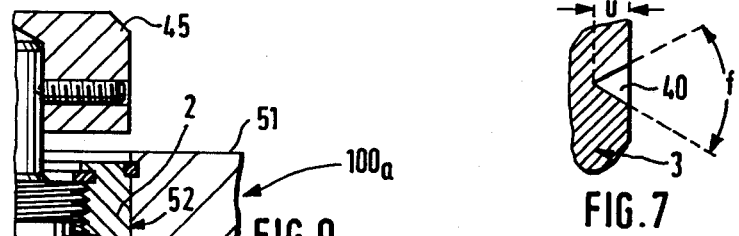
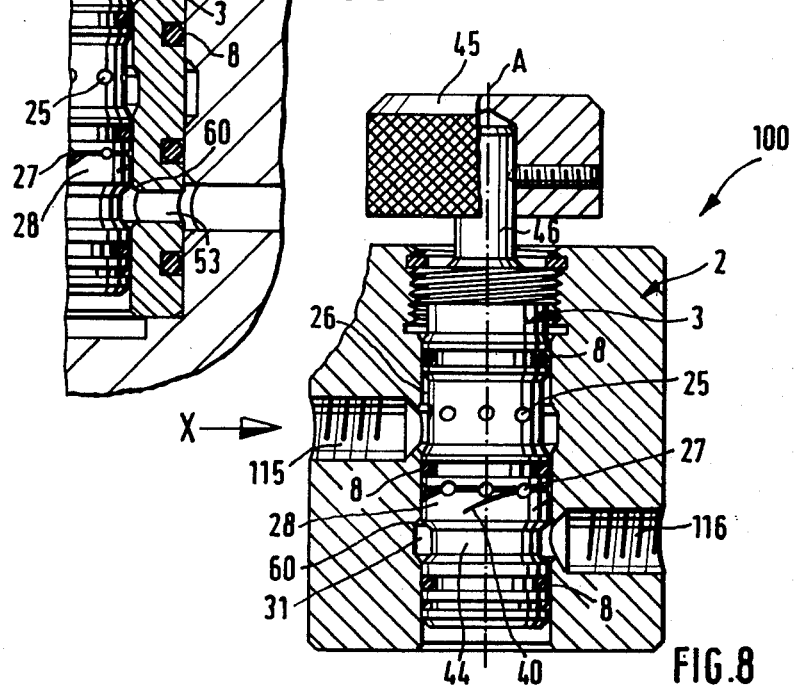

VALVE

BACKGROUND OF THE INVENTION

The invention relates to a control component such as a valve or like member for use in a hydraulic system.

A valve or like member for a hydraulic system is known, comprising an inlet and an outlet for the hydraulic fluid, and a flow passage or throttle bore between the inlet and the outlet, which opens at the end in the direction of flow through the valve, at an outside surface on a valve body portion. Disposed opposite and co-operable with the outside surface of the valve body portion is an inside surface of a sleeve or corresponding member in which the valve body portion is disposed. The inside surface of the sleeve or corresponding member is movable relative to the outside surface of the valve body portion, for flow control purposes. More particularly, with the valve body portion being hollow and screwed into the sleeve or corresponding member, the or each flow passage or throttle bore extends from the hollow interior of the valve body, and is operative to control the flow through the device; a greater or smaller amount of hydraulic fluid can therefore flow through the valve, in dependence on the magnitude of the areas of contact between the co-operable inside and outside surfaces referred to above.

It has been found however that a serious disadvantage of such valves and throttle members for hydraulic fluids is that the lowest constant flow rate is in the region of 0.4 liters per minute. However, in most situations, such a flow rate is too high, and the known valves are therefore unusable in such circumstances.

A further disadvantage arises due to the internal pressure which causes deformation of the valve or throttle sleeve; at pressures at up to around 350 bars, the throttle sleeve sticks or jams, between the flow passages of the valve body portion, over which it becomes enlarged. That consideration means for example that it is only possible under limited conditions to adjust conventional valves under pressure, as the pressure-less edges or lands cause damage to the valve body portion and to the throttle sleeve.

SUMMARY OF THE INVENTION

An object of the present invention is to provide a control component such as a flow control valve or throttle member, which avoids the disadvantages of the above-discussed components.

A further object of the invention is to provide a control component for a hydraulic system, which can be set to a very low hydraulic fluid flow rate.

Yet another object of the invention is to provide a hydraulic system control component which is adapted to be adjusted under pressure.

Still a further object of the present invention is to provide a valve or like member for a hydraulic system, which provides for progressive control of the rate of flow of hydraulic fluid through the component.

Yet a further object of the present invention is to provide a control component such as a valve or throttle device for a hydraulic system, which provides sensitive control of the hydraulic fluid flow rate therethrough.

These and other objects are achieved by a control component in the form of a valve or like member for a hydraulic system, comprising a housing having a bore therein forming an inside surface. A valve body portion is movably disposed within the bore of the housing and has an outside surface co-operable with and movable relative to the inside surface of the housing. Either the housing or the valve body portion has a fluid inlet and a fluid outlet, while a flow duct arrangement extends between the inlet and the outlet for the flow of hydraulic fluid through the component, including at least one flow passage which at its end in the direction of hydraulic fluid flow opens at the outside surface of the body portion. The outside surface of the valve body portion has at least one curved channel portion which extends from the opening of the flow passage and which is disposed at an inclined angle to a radial plane through the body portion. The control component may include a plurality of said flow passages, and a plurality of said curved channel portions operatively associated with at least some of the flow passages.

The valve body portion which is movable in and relative to the housing may be hollow and may form a valve seat with which a spring-loaded valve member is co-operable, whereby the control component is operative to act as a throttle/check valve. The valve body portion may also be disposed movably in the housing in such a way as to form an adjustable throttle valve, for which purpose the valve includes actuating means for displacing the body portion relative to the housing thereby to produce a progressively variable throttling action in the flow of hydraulic fluid through the valve.

In one embodiment of the invention, the outside surface of the valve body portion may be an annular surface, and the radial plane may be defined by an annular peripheral groove formed in the outside surface of the body portion.

The or each channel portion formed in the outside surface of the valve body portion forms a metering passage for the hydraulic fluid, more particularly for a constant flow rate down to a bottom range of about 0.04 liters per minute. This arrangement therefore makes it possible to provide and adjust hydraulic fluid flow rates which are ten times less than the rates which could previously be attained as the lower limit. A reduction in hydraulic fluid flow rate of this kind can also be achieved in accordance with the invention for needle valves; at the present time, the lower limit in regard to hydraulic fluid flow rate, for needle valves which are available commercially, is around 0.2 liters per minute.

The above-mentioned peripheral groove substantially prevents deformation of the sleeve forming the housing of the device, as the groove causes a drop in pressure at the location where hitherto the sleeve was subject to deformation. Consequently, this arrangement provides on the one hand that the housing or sleeve no longer suffers serious deformation sufficient to render the device inoperative, while on the other hand it is possible for the sleeve to be easily adjusted, even at very high pressures, without the likelihood of causing damage to the components of the device.

In accordance with a further feature of the invention, the valve includes a plurality of finite radial flow passages opening at respective locations on the outside surface of the valve body portion, and the peripheral groove in the annular surface interconnects the flow passages. The valve body portion has a hollow interior or an axial bore therein, and the flow passages extend from the interior of the valve body portion to the annular surface thereon and form therefore outlet openings which open into the abovementioned peripheral groove for flow communication therewith.

With such an arrangement, it has been found that it may be advantageous for each two outlet openings which are respectively provided with a channel portion to have at least one outlet opening without channel portion therebetween, so that for example when the annular surface has eight outlet openings therein, only four such openings are provided with channel portions to provide the metering effect.

In accordance with the invention, the metering channel portions do not extend parallel to the axis of the body portion, nor at a right angle thereto, as in that case they would fall into the peripheral groove. It may be appreciated however that it is possible for the peripheral groove to be interrupted at one or more points, although that is not such a desirable construction.

The preferred position in respect of the metering channel portions is determined by an acute initial angle relative to the peripheral groove, which is preferably about 15°. Moreover, the radius of curvature of the curved metering channel portion or portions may substantially correspond to the diameter of the valve body portion, which in an embodiment illustrated by way of example hereinafter is around 26 mm.

The cross-section of the metering channel portion, and optionally also or alternatively the peripheral groove, is triangular, and the preferred aperture angle of the triangular groove or channel portion respectively is about 60°.

According to another feature of the invention, the depth of the cross-section of the or each metering channel portion decreases, preferably progressively, from the outlet opening of the flow passage in the outside surface of the valve body portion, to the tip of the metering channel portion. At the tip of the metering channel portion, the channel portion merely runs out into the outside surface of the valve body portion, without any substantial step, thus forming a smooth and stepless transition between the surface of the valve body portion and the metering channel portion, to give a non-turbulent flow of hydraulic fluid at the transitional point.

The position of the metering channel portion or portions in the annular surface of the valve body portion is determined by the tip of the or each channel portion being disposed at a spacing from an edge of the annular surface. Where the device includes a plurality of metering channel portions, the tips of the channel portions may be disposed on an imaginary peripheral line extending around the annular outside surface of the valve body portion, the spacing between the imaginary line and the above-mentioned edge of the annular outside surface of the valve body portion progressively increasing from a selected first metering channel portion to the last thereof; in other words, the tips of the metering channel portions are disposed on a helical line of small pitch extending around the valve body portion.

In another feature of the invention, with the metering channel portions in the above-described position, that is to say, with their tips on a line which progressively approaches the radial plane in which the outlet openings of the flow passages are disposed, each metering channel portion is of such a length that, as viewed transversely with respect to the axial direction of the valve, each metering channel portion projects beyond the adjacent outlet opening, while being disposed at a spacing therefrom in the axial direction of the valve. If, in accordance with the invention, it is only each second one of the outlet openings of the flow passages which has a metering channel portion, then a metering channel portion extends beyond an outlet opening which does not have a metering channel portion of its own.

The length of the metering channel portions, when viewed as a development of the annular surface, is from about one sixth to one seventh of the length of the annular surface of the valve body portion when viewed as a development thereof, being for example 10 mm in the embodiment illustrated by way of example hereinafter.

In accordance with the invention, the initial angle between the respective metering channel portion and the radial plane or peripheral groove opens in the direction in which the valve body portion is screwed into the housing or sleeve; when a right-hand screwthread is used therefore, the tip of the or each metering channel portion is to the right of the initial end or end which communicates with the respective flow passage, of the metering channel portion.

In order to simplify handling and adjustment of the valve, it has been found advantageous for at least one of the ends of the valve body portion, which projects out of the housing or sleeve, to carry at least one marking means for indicating the spacing of that marking means from the adjacent edge of the sleeve or housing, which spacing will of course alter when the valve body and the housing or sleeve are rotated relative to each other. The marking means may appropriately be in the form of a plurality of marking rings which extend parallel to each other on the valve body portion, with the spacing between each two adjacent marking rings corresponding to the axial relative movement between the valve body portion and the sleeve or housing, upon one revolution of relative rotary movement of those two components. Therefore, four marking rings permit the distance covered by the screwing action over four revolutions to be observed.

In accordance with a preferred feature of the invention, the inside surface of the sleeve or housing member has an annular channel or groove, with the edge of the groove which is towards the outside annular surface of the valve body portion lying substantially at the edge of the outside annular surface, before the screwing-in movement of the valve body portion, while after the valve body portion has been screwed into the sleeve or housing, the edge of the groove contacts the flow passages which open at the annular surface, or the peripheral groove at the edge of the annular surface, the other edge of said groove always being at an axial distance from the edge of the annular surface of the valve body portion.

Further features, advantages and details of the invention will be apparent from the description set out hereinafter of preferred embodiments.

Another object of this invention is a control component for a hydraulic or pneumatic system, comprising: an outer member having an inside surface: a needlelike body portion disposed in the outer member for relative movement therebetween and having an outside surface co-operable with the inside surface of said outer member; a hydraulic fluid or pneumatic medium inlet means; a hydraulic fluid or pneumatic medium outlet means; flow duct means extending between said inlet means and said outlet means; and at least one curved channel or notch portion extending in said outside surface of said body portion from its edge at an angle of inclination to a radial plane through said edge. This new kind of a needle valve may show one or more of the aforesaid criterions or characteristics parts within the frame of this invention. This needle valve may be part of a hydraulic system as well as of a pneumatic system.

BRIEF DESCRIPTION OF THE DRAWINGS

FIG. 1 shows a view in longitudinal section through a control component in the form of a throttle/check valve;

FIG. 1a shows a part of the FIG. 1 structure in a different position of adjustment thereof;

FIG. 2 shows a partly sectional perspective view of the FIG. 1 throttle/check valve;

FIG. 6 shows the development of the cylindrical surface of FIG. 3;

FIG. 7 shows a sectional view on an enlarged scale through the cylinder surface taken approximately along line VII—VII in FIG. 6;

FIG. 8 shows a view in longitudinal section through a second embodiment of the control component, in the form of a throttle valve;

FIG. 9 shows a view in longitudinal section of part of another embodiment of a throttle valve;

DESCRIPTION OF PREFERRED EMBODIMENTS

Figure 3:
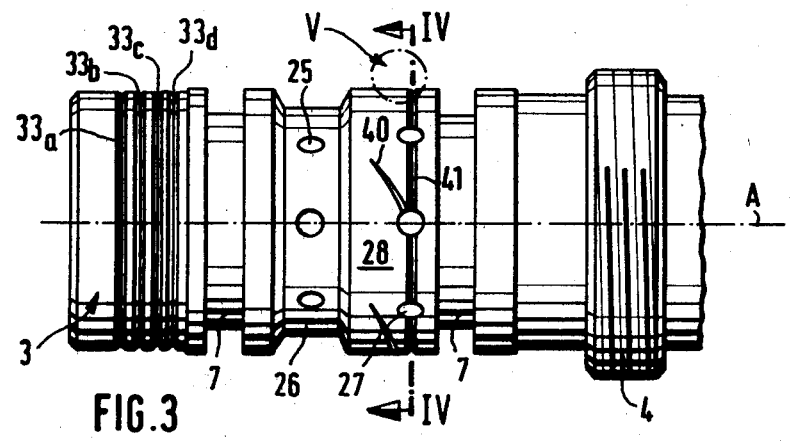
FIG. 3 shows a plan view of a part of the FIG. 1 structure.

Referring firstly to FIG. 1, shown therein is a control component for a hydraulic system, in the form of a throttle/check valve 1 for installation in a hydraulic line (not shown), for a flow of hydraulic fluid through the valve 1 in the direction of the axis A of the valve.

The valve 1 comprises a housing or sleeve 2 and a valve body portion 3 which is mounted therein. The valve body portion 3 has a collar portion 4 having an external screwthread thereon, which engages into a female screwthread 5 on the peripheral inside surface of the sleeve 2, the length of the female screwthread 5 being indicated by i in FIG. 1. The valve body portion 3 is secured in the sleeve 2 so that it cannot be screwed out of the sleeve, by a circlip 6. The valve body portion 3 also has peripheral grooves as indicated at 7, disposed at an axial spacing b from each other, in where there are mounted O-rings 8.

The valve body portion 3 has in its interior a cylindrical piston chamber 9 in which there is movably mounted a piston 10. The piston 10 has a head portion 11 which is of a tapered configuration, as can be clearly seen from FIG. 1, and which co-operates with an annular shoulder 12 formed in the valve body portion 3, acting as a valve seat. The annular shoulder 12 is disposed at the transition between the piston chamber 9, which has a diameter c of for example 11 mm, and an axial bore 13 of smaller diameter d, which is for example 6 mm. Adjoining the axial bore 13 is a connecting chamber 15 which is provided with an internal screwthread at 14 and the width of which substantially corresponds to that of the piston chamber 9. A corresponding connecting chamber 16 is also disposed at the other end of the valve body portion 3, and also has a corresponding screwthread as indicated at 14.

The head portion 11 of the piston 10 is provided with an axial bore as indicated at 17, forming a space or chamber within the head portion 11 of the piston 10. The space 17 communicates with the space around the outside of the head portion 11 of the piston, by way of radial bores 18.

Disposed in the piston 10 adjacent the space 17 is a spring-receiving chamber as indicated at 19. The chamber 19 accommodates a coil compression spring 20, one end of the spring 20 bearing against the end surface of the chamber 19 while the other end of the spring 20 bears against a mounting ring 21 which is disposed in the piston chamber 9 and which is supported against a Seeger ring or circlip retainer 22. The spring 20 urges the piston 10 in a direction tending to apply the head portion 11 of the piston against the annular shoulder 12. The available stroke movement for the piston 10 is indicated by h in FIG. 1.

Radial hydraulic fluid flow passages 25 extend from the axial bore 13 in the valve body portion, to the outside surface thereof, while similar radial flow passages 27 extend from the piston chamber 9 to the outside surface of the valve body portion 3. The bores 25 and 27 extend through the valve body portion 3 at a spacing $b_1$ from each other, which is for example 9 mm. The flow passages 25 from the axial bore 13 open in a peripheral groove 26 in the outside surface of the valve body portion 3, while the flow passages 27 from the piston chamber 9 terminate at a cylindrical outside annular surface 28 of the valve body portion 3. There are for example eight flow passages 27 in the illustrated embodiment. The annular surface 28 is defined on the one hand by the above-mentioned peripheral groove 26 and on the other hand by one of the grooves 7 for receiving an O-ring 8.

Also formed in the inside surface 30 of the sleeve 2 is an annular groove or channel 31 which, in the position of the valve illustrated in FIG. 1, is disposed substantially opposite the peripheral groove 26 in the valve body portion 3. The relative position of the peripheral groove 26 with respect to the channel 31 can be adjusted by screwing the valve body portion 3 by means of the co-operating screwthreads 4 and 5. The respective position of adjustment in regard to the position of the groove 26 and the channel 31 is indicated by a marking means in the form of a plurality of marking grooves 33, of which there are four in the illustrated embodiment, on the end part of the valve body portion 3. As the spacing e between each two adjacent marking grooves 33 corresponds to the length of the axial movement of the valve body portion relative to the sleeve 2 when a full revolution (through 360°) is performed, the number of marking grooves 33 which is visible outside the end surface or edge 34 of the sleeve 2 indicates the number of revolutions in respect of relative rotary movement as between the valve body portion 3 and the sleeve 2. For the sake of enhanced clarity, the four marking grooves are indicated in FIG. 3 by references $33_a$, $33_b$, $33_c$ and $33_d$.

Figure 4:
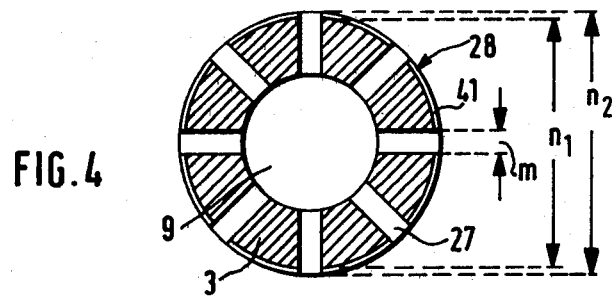
FIG. 4 shows a view in cross-section taken along line IV—IV in FIG. 3.
Figure 5:
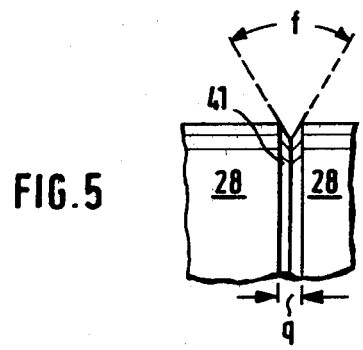
FIG. 5 shows a view of a detail on an enlarged scale of a cylindrical surface in FIG. 3, as indicated at V therein.

Reference will now be made to FIGS. 2 and 3 which clearly indicate that finite curved channel portions 40 are formed in the cylindrical outside annular surface 28 of the valve body portion 3. The channel portions 40 which act as metering channel portions, as will be described hereinafter, communicate with respective ones of the flow passages 27 at the outlet mouth openings thereof. The openings of the flow passages 27 are connected together by an endless peripheral groove or channel 41 which contacts the edges 29 of the openings of the flow passages 27, adjacent the respective channel portions 40. In the illustrated embodiment, the inside diameter $n_1$ (see FIG. 4) of the peripheral groove 41 is 21.5 mm, while the diameter $n_2$ of the part of the valve body portion 3 which provides the annular surface 28 is 22 mm, with the width m of the flow passage 27 being 2 mm. The peripheral groove 41 is of V-shaped cross-section, as can be seen in FIG. 5, and the V-angle f of the groove cross-section is for example about 60°, with the width q of the groove being 0.4 mm. As will be seen from FIG. 7, the channel portions 40 are also of V-shaped cross-section, with an angle f of 60°.

Reference is now made to FIG. 6 which shows the annular surface 28 in a developed form on a larger scale and which shows the mouth openings of the eight flow passages 27 which are joined together by the peripheral groove 41. The spacing between each two adjacent openings of the flow passages 27 is indicated by k. It will be seen from FIG. 6 that the annular surface 28 has four metering channel portions 40 which respectively communicate with alternate ones of the openings of the flow passages 27. Each metering channel portion is disposed in such a way that its initial angle w, that is to say, the angle in the portion of the metering channel 40 which is adjacent the opening of the flow passage 27, relative to the radial plane defined by the groove 41, is about 15°, while the radius of curvature r of each channel portion 40 is for example 26 mm. The developed length of the annular surface 28, or the peripheral length thereof, substantially corresponds to six to seven times the length of a channel portion 40.

Referring still to FIG. 6, it will be seen that each channel portion 40 terminates at a point which is beyond the centre point of the next following flow passage, by a distance s. That distance s is shown in FIG. 6 in relation to the flow passage indicated by $27_f$. The distance s substantially corresponds to the width or diameter m of the flow passage 27.

In addition, the tip of each channel portion 40 terminates at a spacing from the adjacent edge 43 of the annular surface 28. However, the distance of the tips of the channel portions from the edge 43 varies progressively around the peripheral surface 28 or along the developed form of the peripheral surface 28, from left to right in FIG. 6. Thus, the spacing $y_1$ which is for example 1.2 mm between the tip of the left-hand channel portion 40 shown in FIG. 6, and the adjacent surface 43 is shorter than the corresponding spacing $y_2$, which is for example 1.7 mm, at the tip of the right-hand channel portion $40_e$ shown in FIG. 6. This variation in spacing is clearly indicated in FIG. 6 by an imaginary line indicated at G through the tips 42 of the channel portions 40. The depth u of the channel portions 40 (see FIG. 7) is for example 0.3 mm at the respective flow passage 27, and progressively decreases to the tip 42 where the channel portion 40 runs out in a stepless configuration, at the surface 28.

Reference will now be made to FIG. 8 showing a control component or device for a hydraulic system, in the form of a throttle valve indicated generally by reference numeral 100, for installation for example in a control panel or like arrangement. The valve 100 again has the annular surface 28 with its metering channel portions 40 and peripheral groove 41. In this embodiment, the valve body portion 3 is provided with O-rings 8 both at one side of the annular surface 28 and at the side, which is remote therefrom, the peripheral groove 26 associated with the other flow passages 25. The valve body portion also has an O-ring 80 between the two regions of the flow passages 25 and 27. Associated with the region of the flow passages 25 is a radial connecting outer chamber or antechamber 115, while the other radially extending connecting antechamber 116, which is displaced relative to the chamber 115 in the axial direction of the valve, extends from an annular outlet groove 44 in the valve body portion 3, downstream of the annular surface 28 in the direction of hydraulic fluid flow x through the device. In this embodiment, adjustment of the valve body portion 3 in the housing or sleeve 2, by co-operation of the respective screwthreads thereof, which are for example of right hand, is effected by an actuating means comprising an adjusting or setting knob 45 on a shaft 46 connected to the valve body portion 3.

Reference is now made to FIG. 9 showing another embodiment of a throttle valve as indicated generally at 100a, for installation in another piece of equipment as indicated at 51. In the throttle valve 100a, the sleeve or housing 2 is provided with annular grooves 8 in its outside surface 52, for receiving respective O-rings 8. Disposed opposite the outlet groove 44 which is disposed in the valve body portion 3 downstream of the annular surface 28 is an outlet opening 53 in the sleeve, while a corresponding inlet opening which also extends radially, like the outlet opening 53, is arranged in the other half (not shown) of the valve.

Both the annular channel in the inside surface of the sleeve 2, corresponding to the annular channel 31 shown for example in FIG. 1, and a channel which is formed in the sleeve 2 opposite the outlet groove 44 in the valve body portion 3, as shown in FIG. 8, have an edge as indicated at 60, which is adjacent the annular surface 28. It will be noted that, in the devices shown in FIGS. 8 and 9, the flow passages 25 are above the flow passages 27 which have the associated metering channel portions 40, whereas in the device shown in FIGS. 1 and 2, the flow passages 27 having the associated metering channel portions 40 are disposed above the other flow passages 25.

Before the screwing-in movement of the valve body 3 is begun (corresponding to the position shown for example in FIG. 1 in respect of the throttle/check valve illustrated therein), the edge 60 of the above-mentioned channel in the constructions shown in FIGS. 8 and 9 respectively bears against or co-operates with the edge 43 (shown in FIG. 1a) which is directed theretowards, of the annular surface 28. In the course of the screwing movement, the two edges 43 and 60 are moved relative to each other and the channel indicated at 31 in FIG. 1a moves past the annular surface 28 until the arrangement reaches the position shown in FIG. 1a in which the edge 60 of the channel 31 is positioned at the flow passages 27. In that position, the other edge 61 of the channel 31 is at a spacing from the edge 43.

By virtue of the metering channel portions 40 provided in the annular surface 28, thus the co-operation thereof with the above-described structure of the channels permits the through-flow of hydraulic fluid, for example an oil emulsion, to be adjusted down to for example 0.04 liters per minute, so that the flow rate can be ten times less than the flow rate of present commercially available hydraulic valves. The flow passages 27 which act as throttle bores are capable, by virtue of the peripheral groove 41, of preventing pressure peaks and thus substantially eliminate deformation of the valve or throttle sleeve 2, which otherwise occurs in the form of an expansion effect in the sleeve 2 between the flow passages 25 and 27 of the valve body portion 3, at pressures of up to 350 bars. It is for that reason that conventional valves can hardly be adjusted when under pressure, and the pressure-less edges thereof are likely to damage the valve body portion and the sleeve.

Figure 11:
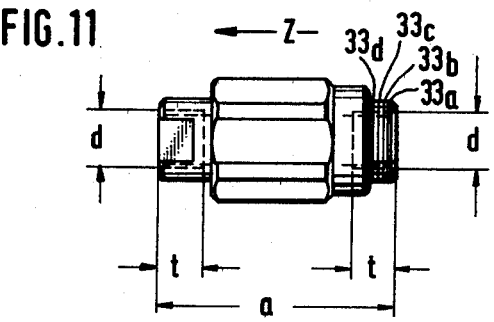
FIG. 11 shows a plan view of a throttle/check valve, for the purpose of illustrating FIG. 10.
Figure 10:
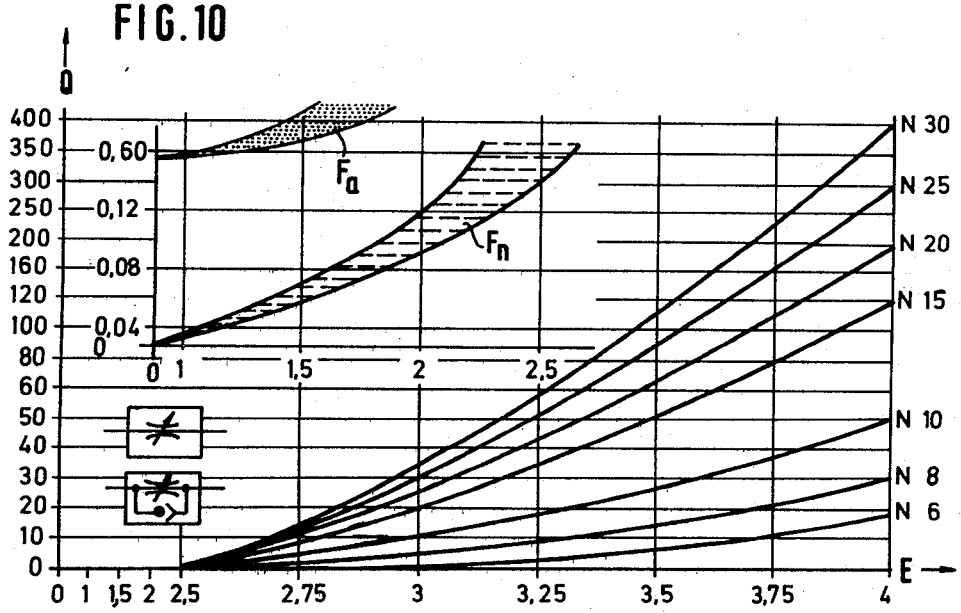
FIG. 10 shows a graph illustrating hydraulic characteristics.

Reference will now be made to FIG. 10 showing rated value or calibration curves N corresponding to the Table set out below, which shows, for each rated value, the connecting diameter d (see FIG. 11), the overall length a and the depth of connection t for the various sizes of valve. Reference may be made in this connection to FIG. 11 which also shows the valve adjustment position, by virtue of the marking grooves $33_a$ through $33_d$, and the direction of adjustment Z by relative rotation between the valve body portion and the sleeve or housing:

| N  | d      | a   | t  |
|----|--------|-----|----|
| 6  | $\frac{1}{4}''$ | 65  | 12 |
| 8  | $\frac{3}{8}''$ | 75  | 12 |
| 10 | $\frac{1}{2}''$ | 80  | 14 |
| 15 | $\frac{3}{4}''$ | 100 | 16 |
| 20 | $1''$  | 110 | 18 |
| 25 | $1\frac{1}{4}''$ | 130 | 20 |
| 30 | $1\frac{1}{2}''$ | 150 | 22 |

FIG. 10 therefore shows the rated value curves relative to the unit E (adjustment value/revolutions); the ordinate gives the flow rate Q in liters/minute. The area $F_a$ shows the characteristic value range in respect of prior valve constructions, while area $F_n$ shows the corresponding values for the characteristics of the valve in accordance with the invention.

Typical operating conditions are set forth in the following Table:

| Pressure fluid | Mineral oil according to DIN 51524 and DIN 51525 |
|---|---|
| Temperature range | −30 to +80° C. |
| Viscosity range | 2.8 to 380 cSt |
| Operating pressure | 5 to 320 bars |
| Test pressure | 250 bars |

It will be appreciated that the above-described embodiments of the control device have been described by way of illustrative example and various modifications and alterations may be made in the construction in accordance with the principles of this invention without thereby departing from the spirit and scope thereof.

Figure 12:
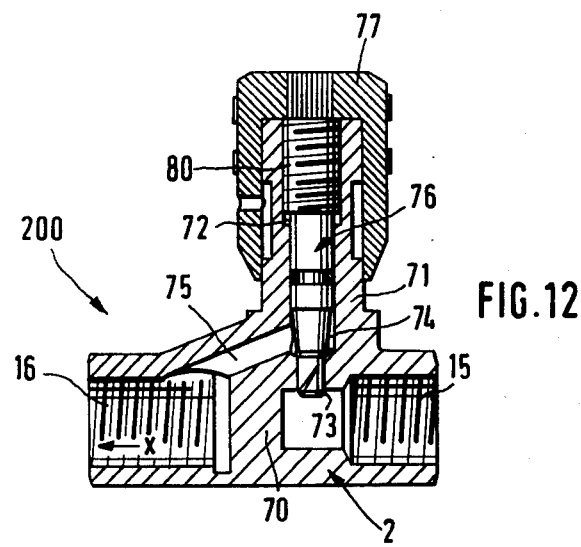
FIG. 12 is a longitudinal section through a needle valve.
Figure 13:
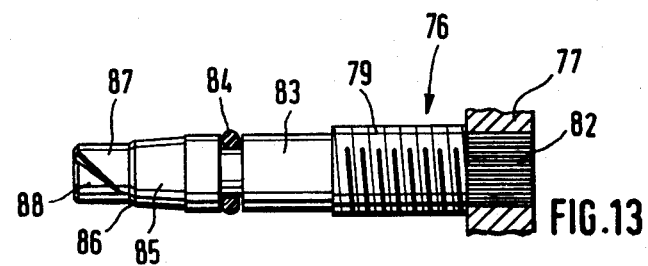
FIG. 13 is a plan view of a part of the structure of FIG. 11.
Figure 14:
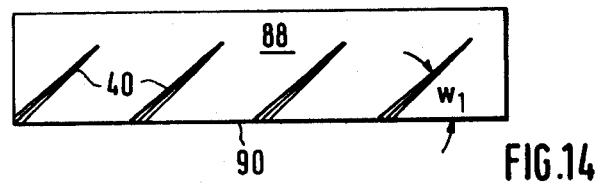
FIG. 14 shows the development of a cylindrical surface of FIG. 13.

The needle control component 200 shown in FIGS. 12 to 14 has the shape of a needle valve with a needle-like body 76, a bore 72 of the housing 2. This bore 72 ends rectangularly at 73 within the first connecting chamber 15. A part of this bore 73 is a valve chest 74 which is connected to the second connecting chamber 15 by an inclined part 75.

The needle 76 is connected with a handwheel 77 by a coupling end portion 82 and is rotably located in a screwed bushing 80 of part 71 by a plug bolt portion 79.

The shaft 83 of this needle 76 comprises an annular tee-slot with an O-ring 84, a cone 85, a shoulder 86 and ends with a cylindrical bolt 87. The surface 88 of this boltlike part 87 comprises four channel portions 40, which begin at the bolt's edge 90 and are inclined. The initial angle $w_1$ is larger than the angle w in FIG. 6. Other characteristics of these grooves, slots or channel portions 40 are discussed with reference to FIG. 6.

What is claimed is:

1. A control component for a hydraulic system, comprising: an outer member having an inside surface; a body portion disposed in the outer member for relative movement therebetween and having an outside surface co-operable with the inside surface of said outer member; a hydraulic fluid inlet means; a hydraulic fluid outlet means; flow duct means extending between said hydraulic fluid inlet means and said hydraulic fluid outlet means and including at least one flow passage opening at its end in the flow direction at said outlet surface of said body portion; and at least one curved channel portion extending in said outside surface of said body portion from said opening of said at least one flow passage at an acute angle of inclination to a radial plane through said body portion wherein the depth and width of said at least one curved channel portion progressively and continuously decreases in size from said opening to the tip of said at least one curved channel portion and the length of said at least one curved channel portion is greater than the length of said opening and less than the circumference of the outside surface of said body portion.

2. A component as set forth in claim 1 wherein said outside surface of said body portion is an annular surface and wherein an annular peripheral groove is formed in said annular surface, the peripheral groove defining said radial plane.

3. A component as set forth in claim 2 wherein said flow duct means includes a plurality of said flow passages extending radially in said body portion and opening at said outside surface and wherein said peripheral groove interconnects said flow passages, and wherein said body portion defines a hollow chamber within said annular surface and communicating with said flow passages.

4. A component as set forth in claim 1 wherein said flow duct means includes a plurality of said flow passages opening at said outside surface and wherein at least one said opening without a said channel portion is disposed between two openings each provided with a said channel portion.

5. A component as set forth in claim 1 wherein said at least one channel portion extends at an initial angle of about 15° to said radial plane.

6. A component as set forth in claim 1 wherein the radius of curvature of said at least one channel portion substantially corresponds to the radius of said body portion.

7. A component as set forth in claim 1 wherein said at least one channel portion is of a substantially triangular cross-section.

8. A component as set forth in claim 2 wherein said peripheral groove is of a substantially triangular cross-section.

9. A component as set forth in claim 7 wherein the angle of said triangular cross-section is about 60°.

10. A component as set forth in claim 8 wherein the angle of said triangular cross-section is about 60°.

11. A component as set forth in claim 1 wherein said outside surface is an annular peripheral surface of said body portion, having an edge extending peripherally of the body portion, and wherein the tip of said at least one channel portion is disposed at a spacing from said edge.

12. A component as set forth in claim 11 and comprising a plurality of said channel portions, wherein the tips of said channel portions are disposed on an imaginary substantially peripherally extending line, the distance of which from said edge progressively increases from a first said channel portion to a last said curved channel portion peripherally of said annular surface.

13. A component as set forth in claim 1 wherein said flow duct means includes a plurality of said flow passages having respective said channel portions and wherein the tip of a said channel portion extends beyond said opening of the adjacent said flow passage, in the direction of opening of the angle between said radial plane and the respective first-mentioned channel portion.

14. A component as set forth in claim 1 wherein the peripheral length of said outside surface substantially corresponds to six to seven times the length of said at least one channel portion.

15. A component as set forth in claim 1 and including co-operating first and second screwthread means on said outer member and said body portion respectively for relative movement thereof, and wherein said angle between said at least one channel portion and said radial plane is open in the direction in which said body portion is screwed into said outer member.

16. A component as set forth in claim 15 wherein said screwthread means are right-hand screwthread means.

17. A component as set forth in claim 1 including marking means on at least a first end of said body portion which projects out of said outer member, for indicating the spacing of the marking means from the adjacent end edge of said outer member, such spacing changing upon said relative movement between said body portion and said outer member.

18. A component as set forth in claim 17 wherein said relative movement between said body portion and said outer member is axial movement produced by co-operating screwthreads of said body portion and said outer member upon relative rotation thereof, and wherein said marking means comprises a plurality of marking ring means, the spacings between respective ones of said ring means corresponding to the relative axial movement between said body portion and said outer member upon one relative revolution thereof.

19. A component as set forth in claim 1 wherein said inside surface of said outer member includes an annular recess having an edge which is towards said outside surface of said body portion and which approximately bears against an edge of said outside surface before the body portion is moved into said outer member, said annular recess communicating with said at least one flow passage after the movement of said body portion into said outer member, the other edge of said recess always being at an axial spacing from said edge of said outside surface.

20. A fluid control valve comprising: an outer housing means having an inside surface; a body portion disposed in said outer housing means and having an outside surface co-operable with the inside surface of said outer housing means; means for displacing said outer housing means relative to said body portion; fluid inlet means in said body portion; fluid outlet means in said body portion; flow duct means extending between said inlet and outlet means and including at least one flow passage opening at its end in the fluid flow direction through the valve at said outside surface of said body portion; a duct portion in said outside surface of said body portion, extending from said opening of said flow passage at an acute angle to a radial plane through said body portion and terminating in said outside surface wherein the depth and width of said duct portion progressively and continuously decreases in size from said opening to the tip of said duct portion and the length of said duct portion is greater than the length of said opening and less than the circumference of the outside surface of said body portion; and a spring-loaded check valve member movably disposed within said body portion and co-operable with a valve seat therein, the arrangement being such that displacement of said outer housing means relative to said body portion produces a variable throttle action on the flow of fluid through the valve, by means of said duct portion.

21. A valve as set forth in claim 20 wherein the flow cross-section of said duct portion progressively decreases from said opening of said flow passage to the tip of the duct portion.

22. A fluid throttle valve comprising: an outer housing means having an inside surface; a body portion disposed in said outer housing means and having an outside surface co-operable with the inside surface of said outer housing means; a fluid inlet means in said outer housing means; fluid outlet means in said outer housing means; flow duct means extending between said inlet and outlet means and including at least one flow passage opening at its end in the fluid flow direction through the valve at said outside surface of said body portion; a duct portion in said outside surface of said body portion, extending from said opening of said flow passage at an acute angle to a radial plane through said body portion and terminating in said outside surface wherein the depth and width of said duct portion progressively and continuously decreases in size from said opening to the tip of said duct portion and the length of said duct portion is greater than the length of said opening and less than the circumference of the outside surface of said body portion; and an actuating means for displacing said body portion relative to said outer housing means thereby to produce a progressively variable throttling action in the flow of fluid between said inlet and outlet means through said at least one flow passage and duct portion.

23. A control component for a hydraulic or pneumatic system, comprising: an outer member having an inside surface; a needlelike body portion disposed in the outer member for relative movement therebetween and having an outside surface co-operable with the inside surface of said outer member; a hydraulic fluid or pneumatic medium inlet means; a hydraulic fluid or pneumatic medium outlet means; flow duct means extending between said inlet means and said outlet means; and at least one curved channel portion extending in said outside surface of said body portion from its edge at an acute angle of inclination to a radial plane through said edge wherein the depth and width of said at least one curved channel portion progressively and continuously decreases in size from said opening to the tip of said at least one curved channel portion and the length of said at least one curved channel portion is greater than the length of said opening and less than the circumference of the outside surface of said body portion.

* * * * *

UNITED STATES PATENT AND TRADEMARK OFFICE
CERTIFICATE OF CORRECTION

PATENT NO. : 4,466,461
DATED : August 21, 1984
INVENTOR(S) : Johann Weiss

It is certified that error appears in the above-identified patent and that said Letters Patent are hereby corrected as shown below:

In Column 10, claim 1, line 19, the word "outlet" should read --outside--.

Signed and Sealed this

Twelfth Day of February 1985

[SEAL]

Attest:

DONALD J. QUIGG

Attesting Officer    Acting Commissioner of Patents and Trademarks